United States Patent [19]

Nair

[11] 4,367,413
[45] Jan. 4, 1983

[54] COMBINED TURBINE AND GENERATOR

[76] Inventor: Ramon Nair, 267 Castle Rd., Beaconsfield, Quebec, Canada, H9W 2W4

[21] Appl. No.: 246,094

[22] Filed: Mar. 20, 1981

Related U.S. Application Data

[63] Continuation-in-part of Ser. No. 155,222, Jun. 2, 1980, abandoned.

[51] Int. Cl.³ .................... F01D 15/10; F03B 13/10; H02K 7/18
[52] U.S. Cl. ........................ 290/52; 290/43; 290/54; 310/52; 310/87
[58] Field of Search .............. 290/52, 43, 54; 310/52, 310/54, 68 R, 68 B, 68 D, 87

[56] References Cited

FOREIGN PATENT DOCUMENTS

451236 10/1927 Fed. Rep. of Germany ........ 290/54

Primary Examiner—J. V. Truhe
Assistant Examiner—Shelley Wade
Attorney, Agent, or Firm—Le Blanc, Nolan, Shur & Nies

[57] ABSTRACT

An electrical machine which can be run as a synchronous generator or as a pump is disclosed. The machine is a true hybrid of a turbine and synchronous generator in that the turbine blades are designed to carry magnetic flux. To that end the blades are made of ferromagnetic material, have pole tips and may be laminated. The blades are preferably of aerofoil section and must be much thicker than conventional turbine blades so as to be capable of carrying the substantial magnetic flux. Field coils provided at the roots of the blades or around the hub of the rotor carrying the blades generate magnetic flux which is carried up through the blades across air gaps to a stator, which may be a conventional synchronous generator stator, and back through the air gaps and blades. The machine is relatively simple and rugged and has fewer parts than conventional turbine generator combinations particularly in that only a single rotor, rather than two, is necessary.

52 Claims, 11 Drawing Figures

COMBINED TURBINE AND GENERATOR

This is a continuation-in-part of application Ser. No. 06/155,222, filed June 2, 1980, now abandoned.

BACKGROUND OF THE INVENTION

Various specific combinations of turbines and synchronous generators have been used in the past. In one known type the whole turbine, generator, shaft, coupling (and in some cases gearbox) are placed in one "bulb" or pod, which is all placed in the water flow. All components lose their heat losses in an enclosed space, the water passages become large, and the whole assembly requires massive support structure. Consequently, thermal, hydraulic, mechanical and civil problems must be solved.

In another known type the so-called tube or tubular turbine or pump, only the turbine runner is placed in the flow tube or conduit. This arrangement is not in fact a combination, and, requires a long shaft which has to be supported and sealed, a coupling, often requires a gearbox, and the generator is separate. Hydraulic losses occur due to the bend in the draft tube and sealing of the shaft is necessary. Complications arise due to the number of components to align, erect and balance.

Because the above described prior systems each involve the use of two inherently separate machines, namely a turbine and a generator, each with its own separate rotating assembly; the whole is relatively complex, and the cost in terms of manufacture and maintenance often high. Also the overall dimensions axially are considerable being essentially at least the addition of those of the separate turbine and generator.

One prior machine which uses a single rotating assembly for both the turbine and the generator is the so-called Harza type machine. In this machine the rotor of the generator is mounted on the periphery of the turbine runner blades rather than on the end of the turbine or common shaft. The turbine runner, shaft and bearings are supported in a flow tube or conduit and the generator rotor and stator are located outside the tube. It should be evident that extremely effective sealings and complicated methods for securing the massive generator rotor to the runner blades are necessary. In all the foregoing combinations, and in others described in the literature the electrical and the hydraulic machines are inherently separate.

It is an object of the present invention to provide a novel synchronous machine which overcomes some or all of the above-mentioned disadvantages.

SUMMARY OF THE PRESENT INVENTION

According to the present invention a combined turbine and a.c. generator is provided in which the turbine blades are designed not only to convert power from flowing liquid, water in most cases, to rotational energy but to act as the salient magnetic poles of a synchronous generator. Thus, the blades are made of a ferromagnetic material, typically steel, and are shaped as a compromise between a traditional turbine blade and the traditional pole piece of a salient pole synchronous machine. The term Magnetically Combined Turbine and Generator (M.C.T.G.) is adopted. The blades are much thicker than traditional turbine blades in order to carry the substantial magnetic flux and are, in a preferred embodiment, of aerofoil section.

The resulting machine is outwardly similar to the Harza type machine discussed above but there are several important basic differences. The turbine blades of the Harza machine do not carry magnetic flux and do not form any part of the generator rotor per se. In contrast, the blades of the present invention serve as magnetic pole pieces which cooperate with the generator stator. To generate the magnetic flux in the blades, direct current supplied field coils are provided either at the blade roots or around the rotor hub at locations between the blades. Of course, in the Harza machine, the field poles and coils are provided outwardly of the blades and have no magnetic linkage with them.

Thus, in the present invention there is truly a single rotor rather than two rotors connected as a single rotating assembly as in the Harza machine.

Thus a novel synchronous generator/pump is provided according to the present invention, the machine being capable of operating as a combined turbine and synchronous generator or as a combined synchronous motor and pump.

In the "generator mode", normal turbine action causes rotation, and supply of direct current to the field coils results in the generation of alternating current at the stator at a frequency proportional to the speed of rotation.

In the "pump mode", when alternating current is applied to the stator and direct current to the field winding, the rotor is turned and the blades pump the liquid.

In the preferred embodiment of the invention, the blades are designed as aerofoil sections angled to operate as an axial flow turbine and ferromagnetic pole pieces are provided at the outer ends of the blades. Copper or other non-magnetic material extends between adjacent pole tips to form a continuous ring (at least on the inside diameter) which assists in achieving smooth fluid flow. This copper may also form part of an armortisseur winding which may be provided in the pole tips, or the copper may itself have sufficient electro-magnetic damping action in conjunction with the solid pole pieces in which case the armortisseur is not used.

The blades have a form usually similar to that of a typical aerofoil section, but an aerofoil section is not mandatory. The blade angle alpha, may vary along the blade length or may be fixed. The optimum blade cross-section proportions are arrived at by "model tests" as a means of determining best flow patterns and minimum cavitation consistent with the ability to carry the necessary substantial magnetic flux. The actual blade thickness as a ratio of average blade width is normally in the range 15% to 40% compared with 2% to 10% the normal range for water turbines or pumps. Typically the blade thickness percentage would be 30% but is believed that a workable device would be achieved at values of 10% or greater. A blade having a thickness equal or greater than 10% is considered "thick" and this expression is used hereinafter to convey this lower limit.

A tendency to increase cavitation is offset by greater blade strength, higher torque and ability to withstand a larger volume of material loss due to cavitation and erosion.

The blade must be of a material, normally a steel, capable of carrying this magnetic flux. This obviates the use of some of the varieties of stainless steel. Alternatively a nonstainless steel of magnetic capability, but suitably plated, heat treated or coated to minimise erosion and cavitation effects can be used.

The pole tips are either attached to the blades, or may be cast with them and must also be of a material capable of carrying magnetic flux. The pole tip has exactly the same function as that in a normal synchronous salient pole machine. It must therefore have a generally similar shape on the outside diameter face, in order to carry the magnetic flux to the air gap.

The pole tip may be rectangular in plan or may be shaped to reduce magnetic leakage and flux harmonics, or may be skewed in plan form, all as stated in the literature in accordance with normal synchronous machine practice, and depending upon the electrical performance requirements. The pole tips may be of homogeneous material (so called "solid pole") or may be of laminated steel, both forms as reported in the literature for conventional synchronous machines. However, the underside (inside diameter) of the pole tips is, preferably, not like that of a conventional synchronous machine as it is radiused so as not to obstruct fluid flow.

The pole tips may carry an amortisseur (damper) winding complete (not shown) or may carry only amortisseur "end rings", both essentially as described in synchronous machine literature.

The blade root, where present, carries the magnetic flux from the blade and thus must be made of steel or ferromagnetic material capable of carrying such flux. The root may or may not be homogeneous with the blade. The root normally secures the blade, and transfers torque between blade and shaft. The transition of magnetic flux from root to blade and from blade to pole tip is preferably aided by intermediate curved shapes obviating sudden sharp angles in the flux direction.

The blades may be formed as a single row or there may be two or more rows of blades on the same rotor. Although principally intended for use in an axial flow configuration the invention is applicable to impulse type turbines in which case the shape of the blades would be modified but could still be "thick" in comparison to conventional turbine technology. Of particular significance with this type of machine is the grouping of the turbine blades such that two or more blades are associated with and flux linked by a single winding. This feature is of lesser significance in relation to but not excluded from axial flow machines.

BRIEF DESCRIPTION OF THE DRAWINGS

The invention will now be described in greater detail with reference to the accompanying drawings, in which.

DESCRIPTION OF THE PREFERRED EMBODIMENT

Figure 1:
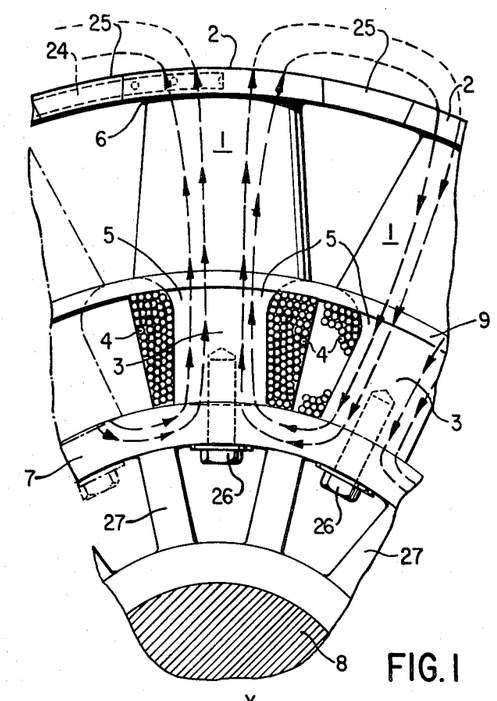
FIG. 1 is a fragmentary partially sectional view of a rotor constructed in accordance with the invention.
Figure 2:
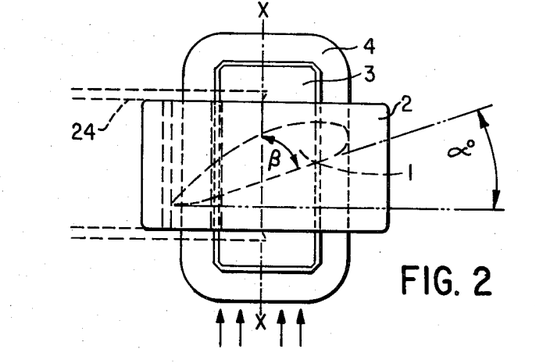
FIG. 2 is a plan view showing a part of the rotor of FIG. 1.

With reference firstly to FIGS. 1 to 4 and particularly to FIGS. 1 and 2, the rotor comprises a single row of blades 1 extending radially at spaced intervals around the periphery of the rotor. The blades 1 are designed not only to extract mechanical energy from a fluid (or impart energy to the fluid in the case of a pump) but to serve as magnetic flux carrying poles. Accordingly for the first purpose, the blades, as can be seen clearly in FIG. 2, are shaped as aerofoil sections and are inclined at an angle α with respect to the axis X of the rotor and flow of hydraulic fluid; to achieve the second purpose the blades are made of a material capable of carrying magnetic flux, and typically steel, which may also be plated treated or coated.

It should be apparent that the blade design will be a compromise, to some extent, between the requirements for efficient transfer of mechanical energy from or to the hydraulic fluid and the requirements for establishing a good magnetic flux path. As a result, the blades are thick in comparison to the usual pump or turbine blades and may have less cross-sectional area than would be ideal for carrying flux in the equivalent normal synchronous machine pole body but this is a matter of degree and depends on the performance required. It is considered that savings are effected in the areas of weight, transportation and ease of erection, particularly for low speed machines.

Figure 4:
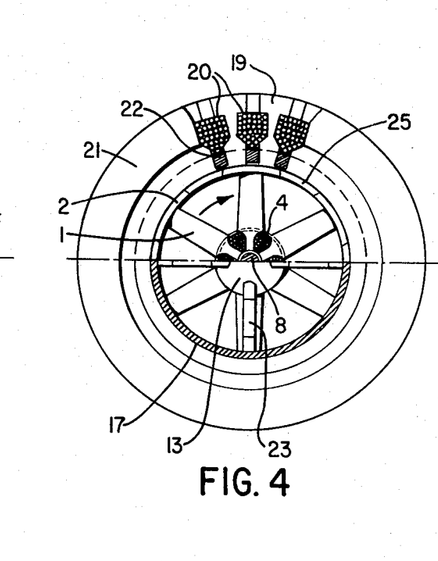
FIG. 4 is an end view, partly in section, showing the synchronous electrical machine of FIG. 3 and the flow tube.

The blade angle alpha, for correct functioning as an impellor blade, is typically between 10° and 50° varying along the length as in conventional impellor blades and, in the embodiment shown in FIG. 1, is around 30° but shown for clarity as fixed along the blade length. The blades can be seen to taper slightly as they project radially outwardly and at their extreme outward ends, they each carry a pole tip 2 which may be cast with the blade 1 and transition piece or shape 6, or may be attached thereto by an appropriate mounting means (not shown). As can be seen in FIGS. 2 and 4 each pole tip 2 is formed as part of a cylinder being rectangular in plan and arcuate in elevation. The pole tips 2 are also formed of ferromagnetic material, typically steel, capable of carrying magnetic flux, and are joined to each other by nonmagnetic part cylindrical portions 25, typically made of copper or stainless steel, such that all of the pole tips and the non-magnetic portions 25 together (essentially) form a ring or cylinder spaced concentrically around the rotor.

This ring is not necessarily continuous; the nonmagnetic portion 25 may be omitted. The cross sectional shape of root items 3 and transition item 5 and the tapering of item 1 may each vary in detail from that shown, depending upon the hydraulic and electrical performance required and the type of winding 4 used. For example, root 3 may be circular in cross-section.

Each blade 1 is cast with or secured to by fastening means (not shown) a pole root 3 which is also made of flux carrying ferromagnetic material, typically steel.

The root is narrower than the blade but as can be seen clearly in FIG. 2, is longer in the rotor axial direction than the blade such that it projects beyond both major surfaces of the blade in order to have adequate cross-sectional area for the magnetic flux. The root 3 is rectangular but is joined to the blade proper by intermediate or transition portion 5 which provides a relatively smoothly curved flux path between the root and the pole tip. A field coil 4 is wound round each pole root and is connected to a source of D.C. power by field connection leads as will be explained below.

Each pole root 3 is secured to a hub 7 by means of a fastener 26 or is cast with the hub or secured thereto in some other manner. The hub also is made of magnetic flux ferromagnetic carrying material, typically steel. The hub is secured to the main rotor shaft 8 by means of a spider 27.

Figure 3:
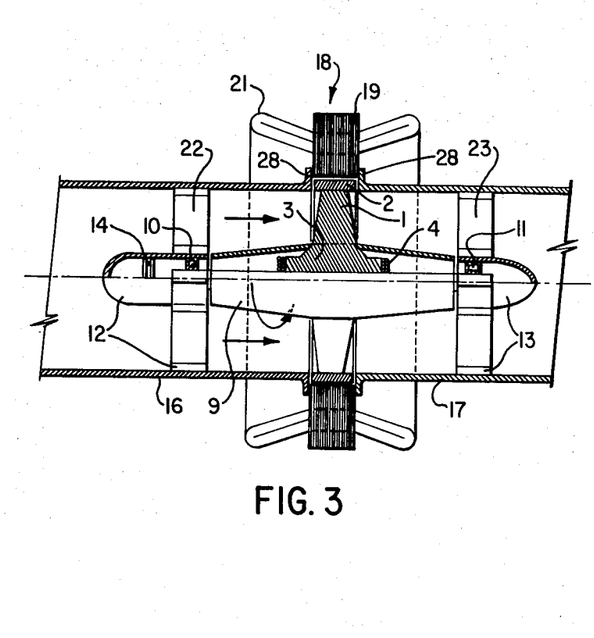
FIG. 3 is a side view, partly in section, showing the rotor of FIGS. 1 and 2 located in a flow tube and assembled with a stator to form a synchronous electrical machine.

With reference more particularly to FIGS. 3 and 4, to protect against fluid flow erosion the rotor shaft 8, hub 7, pole roots 3 and field coils 4 are shown enclosed in a cover 9 part of which is also shown in FIG. 1. To eliminate flux leakage the cover may be made entirely of non-magnetic material or the central portion, i.e. the portion surrounding the field coils 4, may be made of a non-magnetic material such as an epoxy encapsulating the field coils 4 and pole roots 3, with the remainder of the cover being steel.

Rotor shaft 8 is rotatably mounted at its ends in bearings 10 and 11 which are mounted centrally in fixed housings and end frames 12 and 13. End frames 12 or 13, or 12 and 13 contain flow straightening blades, fixed or movable essential for transferring energy to or from the fluid in accordance with accepted axial flow turbine and pump theory and practice. These blades may be fixed or movable. Brushgear 14 or a brushless A.C. exciter (not shown) is located in end frames 12 and/or end frame 13 and this brushgear supplies direct current to coils 4 as in a conventional synchronous machine by field connection leads 29.

Figure 9:
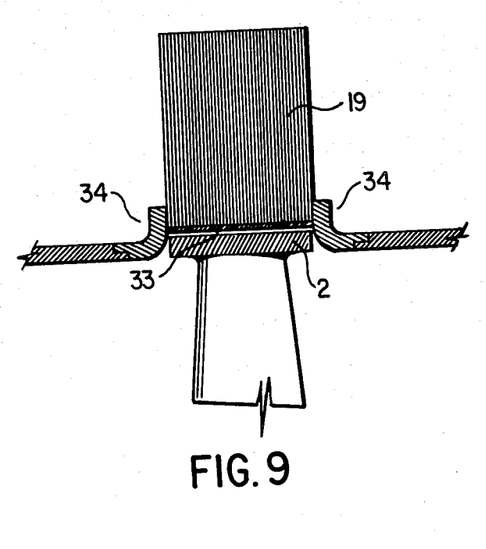
FIG. 9 is an enlarged view of a detail of a further modified flow tube and stator.

A flow tube formed of two halves 16 and 17 is attached to the end frames 12 and 13 by fastening means (not shown) and encloses the rotor assembly almost completely. However, the two halves are not abutted against each other but are brought up adjacent to the pole tips 2 and fastened to each other by fastening means (not shown) thus defining a space between the flanged ends 28 of tube halves 16, 17 accommodating the pole tips which are free to rotate. The flow tube is to shield the pole tips 2 and may be long as shown in FIG. 3 or short as shown in FIG. 9.

A cylindrical stator assembly 18 of conventional a.c. synchronous machine construction comprises a steel laminated core 19, slots 20 and a winding 21 placed in the slots. The winding 21 is a conventional alternating current winding and may be single phase or multiphase. The slots may be magnetically closed, open, or semi-closed as shown, with any slot openings in the laminations being closed by an epoxy or similar material which serves as electrical insulation and sealant against ingress of water.

The stator assembly 18 is received around the flow tube 16, 17 with the laminated core 19 projecting into the space between the flanged ends 28 and with the flanged ends abutting directly against the laminations. Mechanical seals (not shown) may be positioned between the laminations and the end flanges 28 but these may not be necessary for low water heads. The end flanges 12 and/or 13 are provided with moveable vanes or blades 22,23, manually or governor controlled to regulate the flow of water through the flow tube 16,17 and to assist the energy conversion.

Referring back to FIGS. 1 and 2 the pole tips 2 may be provided with an armortisseur winding 24, well known in conventional salient pole synchronous machines and shown for half the pole only for clarity.

The device described above operates as follows. As a synchronous, machine, whether in generating or motoring mode, direct current is supplied via brushgear 14 or from a brushless exciter (not shown but well known per se) to the field coils 4, magnetic flux is generated in the pole cores 3 and this magnetic flux flows, as indicated by the broken lines and arrows in FIG. 1, radially outwardly along one pole piece or blade 1, through the associated pole tip 2, across the air gap between the rotor and stator, through the stator laminations 19 and back across the air gap into the adjacent pole tip, radially inwardly through the adjacent blade 1 and root 3, the path being completed through the hub 7 (similar to conventional synchronous machines).

In the generating mode of this synchronous machine, as water is passed through the flow tube 16, 17 or the inlet and outlet ports of flange 28 if there is no full flow tube, the blades 1 (and the rotor) are rotated by the water and the magnetic flux from each field coil 4 when excited is successively linked with the stator winding 21. Thus, the stator winding will alternately embrace a maximum positive and a maximum negative value of flux and so an a.c. voltage proportional to the flux change is induced in the stator winding. The frequency of the voltage generated is, as in all synchronous machines, proportional to the speed of rotation of the rotor.

Thus the equivalent operation and function of a separate turbine and synchronous generator obtains.

In the motoring mode of this synchronous machine, alternating current supplied to the stator winding and direct current to the field coils 4 causes the rotor to rotate and the blades 1 to pump water through the flow tube 16, 17. Thus the equivalent operation and function of a separate pump (or blower) and synchronous motor obtains.

Whether being operated as a turbine or a pump, the non magnetic copper or stainless steel portions 25 between the pole tips 2 improve the fluid flow thus reducing frictional losses. The portions 25 also assist the synchronous machine electromagnetic damping action whether or not a separate amortisseur winding 24 is used.

Although the unit of FIG. 3 is shown aligned on a horizontal axis, it should be appreciated that the flow tube (and, of course, the rotor, stator, and other components) could be inclined with respect to the horizontal whether or not a flow tube is used.

Figure 5:
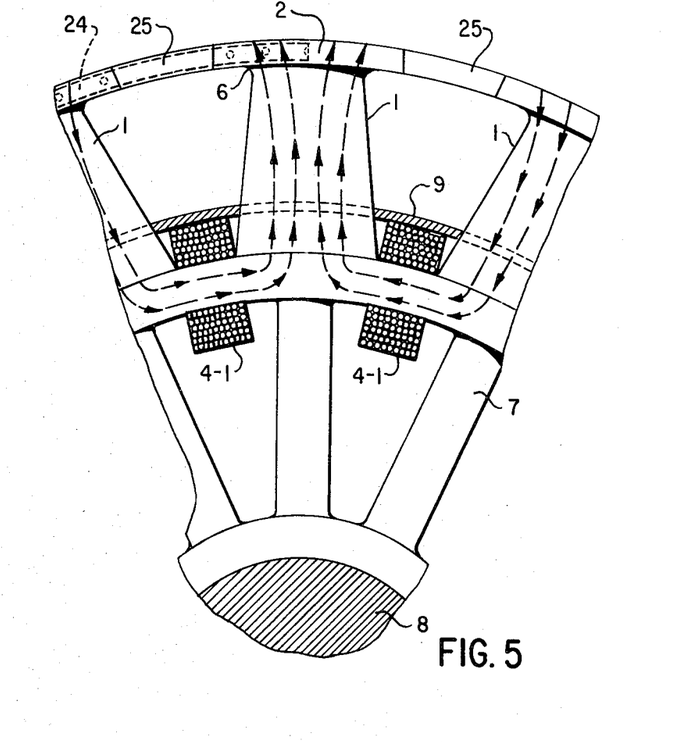
FIG. 5 is a view similar to FIG. 1 but showing an alternative embodiment of the invention.
Figure 6:
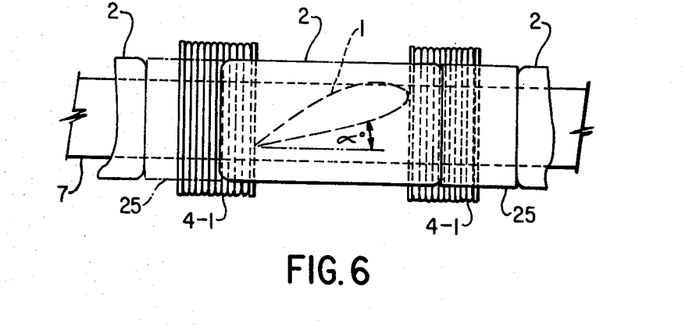
FIG. 6 is a plan view showing that part of the alternative embodiment shown in FIG. 5.

With reference now to FIGS. 5 and 6, the embodiment shown is identical to that of FIGS. 1 to 4 except that the pole roots 3 are dispensed with, the field coils 4' being wound around the rotor hub 7. The remainder of the machine and its operation are identical to the embodiment of FIGS. 1 to 4.

Figure 7:
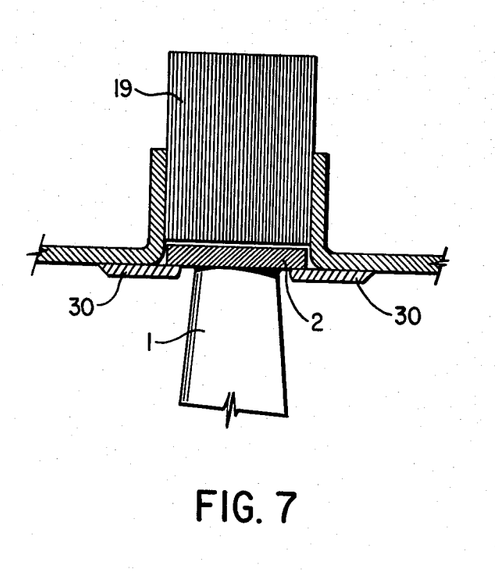
FIG. 7 is an enlarged view of a detail of a modified flow tube.

With reference to FIG. 7, this shows a detail of a modified flow tube in which mechanical ring seals 30 are fixed to the inside of the tube halves 16 and 17 adjacent the flanges 28. The seals 30 project towards each other and lightly engage the radially inward edges of the pole tips 2 when the rotor is in position thus restricting water leakage through the air gap between the pole tips 2 and stator core 19.

Figure 8:
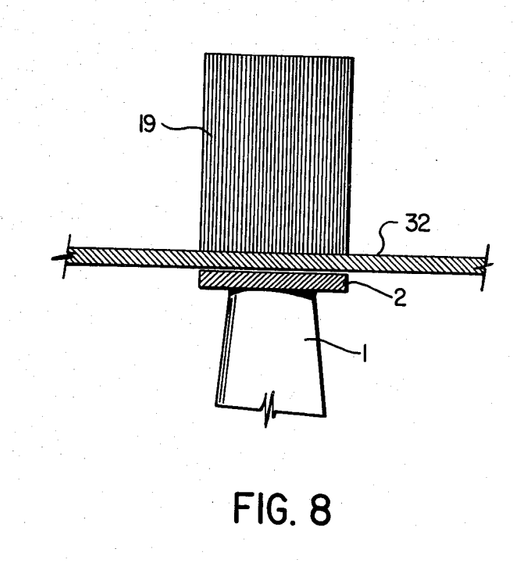
FIG. 8 is an enlarged view of a detail of a further modified flow tube.

In another modification, as seen in FIG. 8, the flow tube 32 is not formed of two halves but is continuous, the rotor being entirely contained within it and the stator entirely outside it.

With reference to FIG. 9 this shows a modification whereby the flanged ends of flow tubes 16 and 17 of FIG. 3 are replaced by stainless steel or other non-magnetic flanges 34 in order to reduce magnetic leakage, and a stainless steel or other non-magnetic material in the form of sleeve item 33 reduces water leakage and protects the lamination of item 19 stator from corrosion. It is not essential that both item 33 and item 34 be used concurrently.

Figure 10:
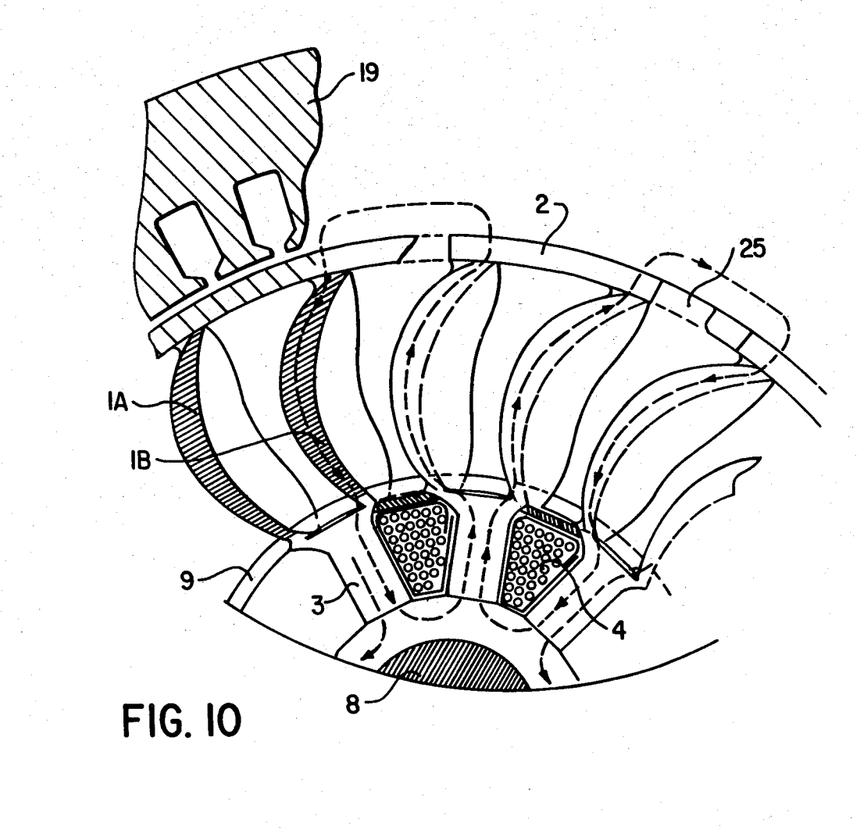
FIG. 10 is a view similar to FIG. 1 but showing an alternative embodiment of the invention.
Figure 11:
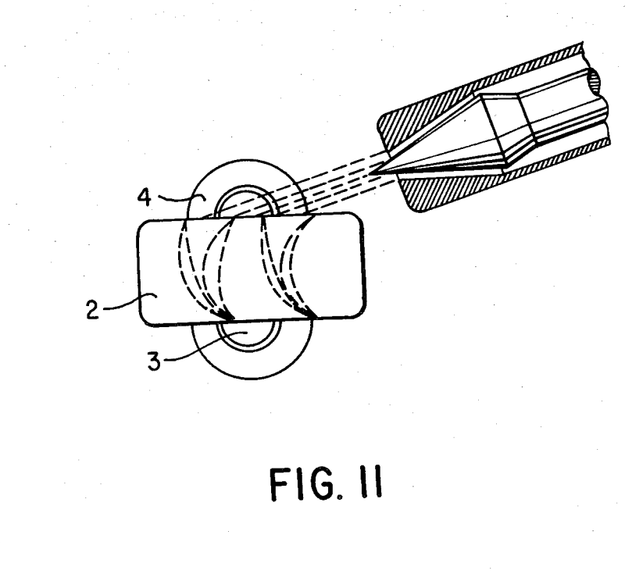
FIG. 11 is a plan view showing a part of the rotor of FIG. 10 and associated spear valve.

With reference to FIGS. 10 and 11, these show an alternative embodiment in which field winding 4, pole root 3, blades 1A and 1B, pole tips 2, amortissuers 24, non-magnetic portions 25 perform the same functions as those of like number and description in FIG. 1. A magnetic flux is generated by windings 4 which cooperate with stator 19 in which conventional synchronous machine stator windings are placed, the whole acting as a synchronous generator albeit again with a magnetic circuit modified from that of conventional separate synchronous machines.

The essential difference in this alternative embodiment is that there may be one or more blades attached to any one pole root 3 and pole tip 2. In the example shown there are two blades, 1A and 1B but more blades are possible. The objective of more than one blade for each pole root 3 and coil 4 is to increase the frequency in cycles per second of the voltage generated by the stator 19. This embodiment is envisaged as being more appropriate to the impulse turbine principle. Hence a spear jet for directing water onto the blades 1A and 2A is shown rendering the device as a whole a type of inclined jet impulse turbine for which one or more spear jets may be used and, having water entering from the side as shown in FIG. 11, dispenses with axial flow and the flow tubes long or short of FIG. 1 embodiment. The requirement of carefully designed blades of section based upon aerofoils, but generally of the impulse type rather than the axial flow propellor blades of FIG. 2, remains.

Items 33 and 34 of FIG. 9 also apply as modifications to this embodiment. This embodiment is used for generating and not normally for pumping.

In all the specific embodiment of the invention described field windings provided the magnetic field necessary to the operation of the machine but, in some applications, it is envisaged that the field windings could be dispensed with and individual permanent magnets located in place of pole roots 3 (FIG. 1) and in the hub at the position of field windings 4-1 of FIG. 5 and FIG. 6, or the blades themselves could be constructed of permanent magnet material.

What is claimed is:

1. An axial flow rotor for an electrical a.c. salient pole synchronous machine, the rotor having a plurality of circumferentially spaced thick, axial flow propellor turbine blades for transferring mechanical energy to or from a liquid, the blades being formed of a ferromagnetic material and being mutually interconnected at their radially inner ends by portions of the rotor also made of ferromagnetic material, direct current field windings associated with respective blades and located proximate radially inward portions of the blades so as to generate magnetic flux in the blades and pole tips of ferromagnetic material carried at the radial extremities of the blades so as to shape and distribute the magnetic flux carried by the blades.

2. A rotor according to claim 1 wherein the field coils are respectively wound on blade root portions.

3. A rotor according to claim 1 wherein the field coils are wound around a ferromagnetic hub at locations intermediate the blades.

4. A rotor according to any of claims 1 to 3 wherein the pole tips are interconnected to each other by non-magnetic portions forming together with the pole tips a continuous ring.

5. A rotor according to any of claims 1 to 3 wherein the pole tips are interconnected to each other by copper portions forming together with the pole tips a continuous ring.

6. A rotor according to any of claims 1 to 3 wherein the ferromagnetic material is steel.

7. A rotor according to any of claims 1 to 3 wherein the ferromagnetic material is a steel alloy.

8. A rotor according to any of claims 1 to 3 wherein the blades are made of laminations.

9. A rotor according to any of claims 1 to 3 wherein the pole tips are made of laminations.

10. A rotor according to any of claims 1 to 3 wherein the blades are formed as aerofoil sections.

11. A rotor according to any of claims 1 to 3 including a cover means formed in a generally cylindrical shape, the cover means being secured on the rotor coaxially so as to enclose the field coils and seal them against ingress of water, the cover means being of non-magnetic material at least adjacent the poles.

12. An electrical a.c. salient pole synchronous generator/pump comprising a stator and a rotor, the rotor having a plurality of circumferentially spaced thick, axial flow propellor turbine blades for transferring mechanical energy to or from a liquid, the blades being formed of a ferromagnetic material and being mutually interconnected at their radially inner ends by portions of the rotor also made of ferromagnetic material, direct current field windings associated with respective blades and located proximate radially inward portions of the blades so as to generate magnetic flux in the blades and pole tips of ferromagnetic material carried at the radial extremities of the blades so as to shape and distribute the magnetic flux carried by the blades, the stator containing a winding and a laminated ferromagnetic core, the stator being adapted to surround the rotor with the ferromagnetic core spaced by a small gap from the pole tips whereby continuous magnetic flux paths comprising the blades, pole tips, stator core are formed and link the stator winding.

13. A machine according to claim 12 wherein the field coils are respectively wound on blade root portions.

14. A machine according to claim 12 wherein the field coils are wound around a ferromagnetic hub at locations intermediate the blades.

15. A machine according to any of claims 12 to 14 wherein the pole tips are interconnected to each other by non-magnetic portions forming together with the pole tips a continuous ring.

16. A machine according to any of claims 12 to 14 wherein the pole tips are interconnected to each other by copper portions forming together with the pole tips a continuous ring.

17. A machine according to any of claims 12 to 14 wherein the ferro-magnetic material is steel.

18. A machine according to any of claims 12 to 14 wherein the ferromagnetic material is a steel alloy.

19. A machine according to any of claims 12 to 14 wherein the blades are made of laminations.

20. A machine according to any of claims 12 to 14 wherein the blades are formed as aerofoil sections.

21. A machine according to any of claims 12 to 14 wherein a non-magnetic sleeve is provided on the stator core between the core and the pole tips.

22. An electrical a.c. salient pole synchronous generator/pump comprising a stator, an axial flow rotor and a flow tube, the axial flow rotor having a plurality of circumferentially spaced thick, axial flow propellor turbine blades for transferring mechanical energy to or from a liquid, the blades being formed of a ferromagnetic material and being mutually interconnected at their radially inner ends by portions of the axial flow rotor also made of ferromagnetic material, direct current field windings associated with respective blades and located proximate radially inward portions of the blades so as to generate magnetic flux in the blades, pole tips of ferromagnetic material carried at the radial extremities of the blades so as to shape and distribute the magnetic flux carried by the blades, the stator containing a winding and a laminated ferromagnetic core, the stator surrounding the axial flow rotor with the ferromagnetic core spaced by a small gap from the pole tips whereby continuous magnetic flux paths comprising the blades, pole tips, stator core are formed and link the stator winding, the flow tube surrounding the rotor and establishing an axial fluid flow path through the rotor, the tube being formed in two parts defining a circular gap into which projects from the outside the stator core and from the inside the pole tips.

23. The invention of claim 22 wherein the field coils are respectively wound on blade root portions.

24. The invention of claim 22 wherein the field coils are wound around a ferromagnetic hub at locations intermediate the blades.

25. The invention according to any of claims 22, 23 or 24 wherein the pole tips are interconnected to each other by non-magnetic portions forming together with the pole tips a continuous ring.

26. The invention according to any of claims 22, 23 or 24 wherein the pole tips are interconnected to each other by copper portions forming together with the pole tips a continuous ring.

27. The invention according to any of claims 22, 23 or 24 wherein the ferromagnetic material is steel.

28. The invention according to any of claims 22, 23 or 24 wherein the ferromagnetic material is a steel alloy.

29. The invention according to any of claims 22, 23 or 24 wherein the blades are made of laminations.

30. The invention of claim 22, 23 or 24 further comprising end frames at opposite ends of the flow tube at least one of the end frames having means for regulating the flow of fluid through the tube.

31. The invention of claim 22, 23 or 24 wherein the tube parts have non-magnetic end flanges which abut the stator core.

32. An axial flow rotor for an electrical a.c. salient pole synchronous machine, the rotor having a plurality of circumferentially spaced thick, axial flow propellor turbine blades for transferring mechanical energy to or from a liquid, the blades being formed of a ferromagnetic material and being mutually interconnected at their radially inner ends by portions of the rotor also made of ferromagnetic material, permanent magnet means associated with respective blades and located proximate radially inward portions of the blades so as to generate magnetic flux in the blades and pole tips of ferromagnetic material carried at the radial extremities of the blades so as to shape and distribute the magnetic flux carried by the blades.

33. A rotor for an electrical a.c. salient pole synchronous machine, the rotor having a plurality of circumferentially spaced thick turbine blades of the impulse type for transferring mechanical energy from a liquid, the blades being formed of a ferromagnetic material and being mutually interconnected at their radially inner ends by portions of the rotor also made of ferromagnetic material, direct current field windings each of which is associated with at least one blade, the field windings being located proximate radially inward portions of the blades so as to generate magnetic flux in the blades and pole tips of ferromagnetic material carried at the radial extremities of the blades, so as to shape and distribute the magnetic flux carried by the blades.

34. A rotor according to claim 33 wherein the blades are divided into a plurality of groups each of which is made up of a like plurality of blades and wherein a respective one of the field windings is associated with each group.

35. A rotor according to claim 33 or 34 wherein the field coils are respectively wound round on blade root portions.

36. A rotor according to claim 33 or 34 wherein the field coils are wound around a ferromagnetic hub at locations intermediate to the blades.

37. A rotor according to claim 33 or 34 wherein the pole tips are interconnected to each other by non-magnetic portions forming together with the pole tips a continuous ring.

38. A rotor according to claim 33 or 34 wherein the pole tips are interconnected to each other by copper portions forming together with the pole tips a continuous ring.

39. A rotor according to claim 33 or 34 wherein the ferromagnetic material is steel.

40. A rotor according to claim 33 or 34 wherein the ferromagnetic material is a steel alloy.

41. A rotor according to claim 33 or 34 wherein the pole tips are made of laminations.

42. An electrical A.C. salient pole synchronous generator comprising a stator and a rotor, the rotor having a plurality of circumferentially spaced thick turbine blades of the impulse type for transferring mechanical energy from a liquid, the blades being formed of a ferromagnetic material and being mutually interconnected at their radially inner ends by portions of the rotor also made of ferromagnetic material, direct current field windings each of which is associated with at least one blade, to fold windings being located proximate radially inward portions of the blades so as to generate magnetic flux in the blades and pole tips of ferromagnetic material carried at the radial extremities of the blades, so as to shape and distribute the magnetic flux carried by the blades, the stator being adapted to surround the rotor with the ferromagnetic core spaced by a small gap from the pole tips whereby continuous magnetic flux paths comprising the blades pole tips, stator core are formed and link the stator winding.

43. A machine according to claim 43 wherein the blades are divided into a plurality of groups each of which is made up of a like plurality of blades and wherein a respective one of the field windings is associated with each group.

44. A machine according to claim 42 or 43 wherein the field coils are respectively wound round on blade root portions.

45. A machine according to claim 42 or 43 wherein the field coils are wound around a ferromagnetic hub at locations intermediate to the blades.

46. A machine according to claim 42 or 43 wherein the pole tips are interconnected to each other by non-magnetic portions forming together with the pole tips a continuous ring.

47. A machine according to claim 42 or 43 wherein the pole tips are interconnected to each other by copper portions forming with the pole tips a continuous ring.

48. A machine according to claim 42 or 43 wherein the ferromagnetic material is steel.

49. A machine according to claim 42 or 43, wherein the ferromagnetic material is a steel alloy.

50. A machine according to claim 42 or 43 wherein the pole tips are made of laminations.

51. A machine according to claim 42 or 43 wherein a non-magnetic sleeve is provided on the stator core between the core and the pole tips.

52. An axial flow rotor for an electrical A.C. salient pole synchronous machine, the rotor having a plurality of circumferentially spaced thick, axial flow propellor turbine blades for transferring mechanical energy to or from a liquid, the blades being formed of a ferromagnetic material and being mutually interconnected at their radially inner ends by portions of the rotor also made of ferromagnetic material, direct current field windings each of which is associated with at least one blade, the field windings being located proximate radially inward portions of the blades so as to generate magnetic flux in the blades and pole tips of ferromagnetic material carried at the radial extremities of the blades so as to shape and distribute the magnetic flux carried by the blades.

* * * * *